United States Patent [19]

Koeijmans

[11] Patent Number: 4,633,448

[45] Date of Patent: Dec. 30, 1986

[54] THREE-DIMENSIONAL DISPLAY OF ADJACENT SEISMIC SECTIONS

[75] Inventor: Gerard D. Koeijmans, Dallas, Tex.

[73] Assignee: Mobil Oil Corporation, New York, N.Y.

[21] Appl. No.: 334,347

[22] Filed: Dec. 24, 1981

[51] Int. Cl.$^4$ ............................................. G01V 1/34
[52] U.S. Cl. ...................................... 367/72; 367/68; 364/421; 340/752
[58] Field of Search .................. 367/68, 69, 71, 72, 367/73, 74, 70; 340/752, 700, 755; 360/6; 346/33 C; 352/86, 91 R; 353/7; 364/421, 414, 522

[56] References Cited

U.S. PATENT DOCUMENTS

| | | | |
|---|---|---|---|
| 3,539,981 | 11/1970 | Sattlegger | 367/72 |
| 3,638,178 | 1/1972 | Stephenson | 367/47 |
| 3,688,249 | 8/1972 | Backus et al. | 367/47 |
| 3,742,289 | 6/1973 | Koeijmans | 367/71 |
| 4,032,912 | 6/1977 | Wood | 367/72 |
| 4,063,216 | 12/1977 | Chapman | 367/72 |
| 4,241,429 | 12/1980 | Bloomquist et al. | 367/52 |
| 4,467,461 | 8/1984 | Rice | 367/70 |

OTHER PUBLICATIONS

Robb et al., "Quantitative Imaging of Dynamic Structure and Function of the Heart, Lungs and Circulation by Computerized Reconstruction and Subtraction Techniques," Computer Graphics (USA) vol. 10, No. 2, Summer (1976) pp. 246–256.
"3rd Seismics", distributed by GECO, Geophysical Company of Norway A-S.

Primary Examiner—Thomas H. Tarcza
Assistant Examiner—Ian J. Lobo
Attorney, Agent, or Firm—Alexander J. McKillop; Michael G. Gilman; Charles J. Speciale

[57] ABSTRACT

A computergraphics system display seismograms in a three-dimensional presentation of the subsurface formations of a section of the earth from which the seismograms were obtained. Digital seismic sections are converted to video signals which are recorded on a video recorder. The seismic sections are successively displayed on a television monitor to produce a visual impression of movement through the subsurface formations represented by the successive seismic sections.

10 Claims, 4 Drawing Figures

|  | | TRACE 1 | TRACE 2 | | TRACE 480 |
|---|---|---|---|---|---|
| | 1 | 11011 | 11011 | | 11100 |
| | 2 | 11010 | 11010 | | 11100 |
| | 3 | 11010 | 11010 | | . |
| | 4 | xxxxx | xxxxx | | . |
| | | ..... | ..... | | . |
| | 500 | xxxxx | xxxxx | | xxxxx |

THREE-DIMENSIONAL DISPLAY OF ADJACENT SEISMIC SECTIONS

BACKGROUND OF THE INVENTION

This invention relates to the display of seismograms in a three-dimensional presentation of the subsurface formations of a section of the earth from which the seismograms were obtained.

Seismograms are typically reproduced on paper so that they can be studied by the geophysicist for interpretation of the characteristics of the subsurface formations of the earth. Recent developments in computer-graphics have provided the geophysicist with an important new tool for processing and displaying the vast amounts of seismic data which must be analyzed to correctly interpret the characteristics of the earth's subsurface formations. U.S. Pat. No. 3,742,289—Koeijmans shows a video display system which may be incorporated in an overall computergraphics system with man-machine interactive communication. The system of that patent uses a raster scan display of seismograms on a cathode ray tube driven by a cyclical storage device such as a drum or disk.

Recently, it has been recognized that seismograms from a single line of exploration on the earth's surface do not provide sufficient information about the earth's subsurface character. Such information can be provided only by seismograms obtained from a number of lines of exploration, typically parallel lines on the surface of the earth. Seismic sections generated in this manner can be processed so that they represent the three-dimensional characteristics of the earth's subsurface formation. See U.S. Pat. No. 4,241,429—Bloomquist et al.

The desirability of producing a three-dimensional display from such seismograms has been recognized. U.S. Pat. No. 3,638,178—Stephenson and U.S. Pat. No. 4,063,216—Chapman et al show the conversion of seismic sections to a form such that an orthographic or isometric view, respectively, can be presented on a two-dimensional television screen. State of the art three-dimensional display of seismograms is described in a brochure entitled "Three-D Seismics" distributed by GECO, Geophysical Company of Norway A-S. When seismograms are converted into three-dimensional projections in this manner, resolution and clarity are lost. Other attempts to present a three-dimensional display have included using two cathode ray tubes and a stereoscopic viewing system as shown in U.S. Pat. No. 3,539,981—Sattlegger.

Prior art techniques of displaying of seismograms have need for improvement. It is desirable to display seismic sections in an accurate presentation which truly represents the three-dimensional character of the subsurface formations. Moreover, it is desirable to present such displays on a television monitor which may have large screen capability so that the presentation can be viewed by a group of geophysicists to facilitate discussion of the interpretation.

SUMMARY OF THE INVENTION

In accordance with the present invention, a three-dimensional presentation of the subsurface formations of a section of the earth is produced by successively displaying on a television monitor a recorded sequence of adjacent seismic sections. This produces a visual impression of movement through the subsurface formations in a manner which greatly facilitates the interpretation of the seismograms by the geophysicist.

In carrying out the invention, the seismograms are arranged in arrays of digital words representing seismic sections. Each word in the array represents the amplitude of reflected seismic energy as a function of distance along the line of exploration and depth of the reflector. These arrays are stored in a cyclical memory such as a magnetic disk unit. The words of each array are retrieved in a sequence such that distance and depth correspond with horizontal and vertical sweep of a television raster. The retrieved digital words are converted into a video signal which is recorded in a sequence representing successive, adjacent, seismic sections. These seismic sections are successively displayed on a television monitor to produce the visual impression of movement through the subsurface formations.

The foregoing and other objects, features and advantages of the invention will be better understood from the following more detailed description and appended claims.

SHORT DESCRIPTION OF THE DRAWINGS

FIG. 4 depicts an array of digital words representing a seismic section.

DESCRIPTION OF THE PREFERRED EMBODIMENT

Figure 1:
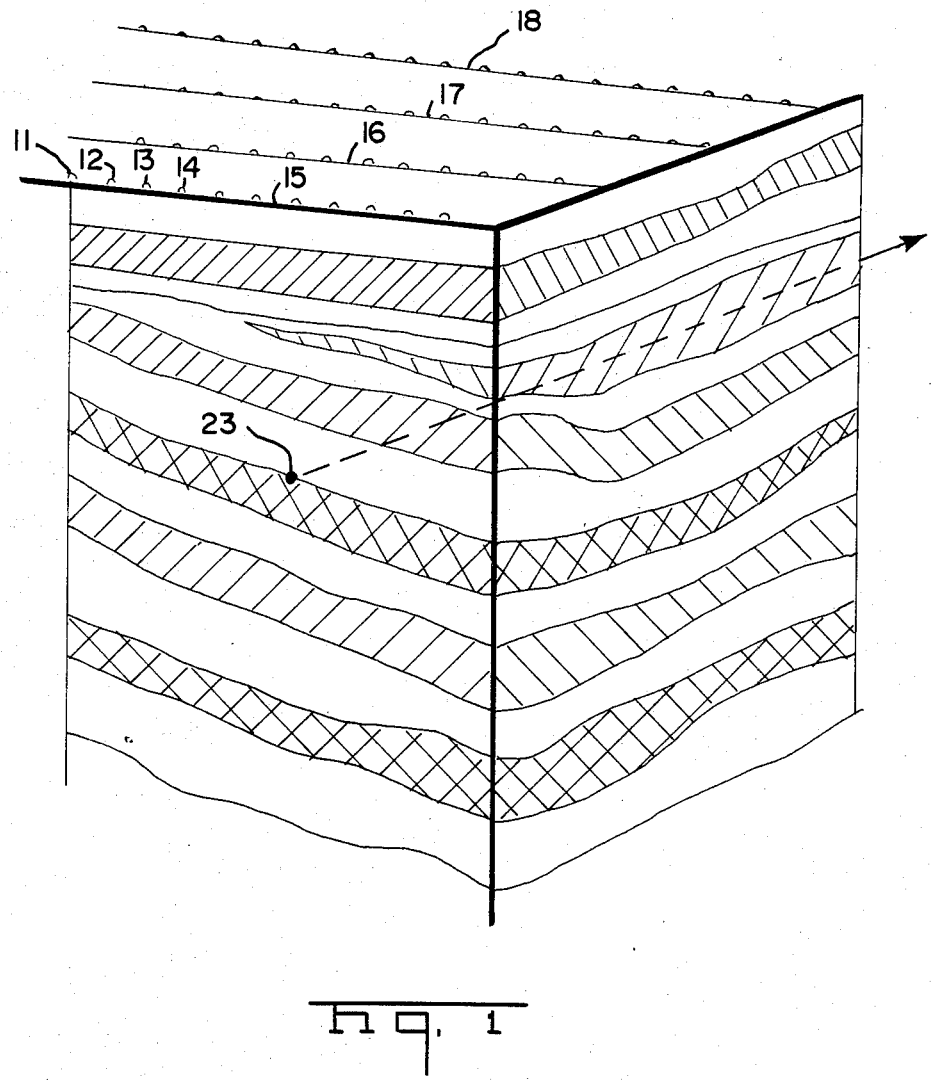
FIG. 1 shows a segment of the earth from which seismograms are obtained.

FIG. 1 depicts a segment of the earth's subsurface with the layering of subsurface formations. In seismic exploration, energy is imparted to the earth by exploding dynamite or by a vibrator or the like. The seismic energy travels through the earth, is reflected from subsurface interfaces between formations of differing characteristics and is detected by geophones such as those indicated at 11–14. This seismic exploration typically proceeds along a line of exploration such as that indicated by the numeral 15. Seismic traces represent the amplitude of detected seismic energy as a function of time after the detonation of the shot. In a prevalent type of exploration referred to as "common depth point gathering", the traces representing reflections from common reflecting points are gathered into sets. The traces represent the detection of seismic energy at spaced points along the line of exploration. A set of seismic traces arranged in this manner is referred to as a "seismic section" because it represents the layering of a section of the earth, in this case the section under the line 15. In order to account for the three-dimensionality of the subsurface layering, exploration is performed along successive parallel lines of exploration 16, 17 and 18. U.S. Pat. No. 4,241,429—Bloomquist et al describes seismic exploration in which the seismograms are processed to form seismic sections with three-dimensional reflection geometry.

Figure 2:
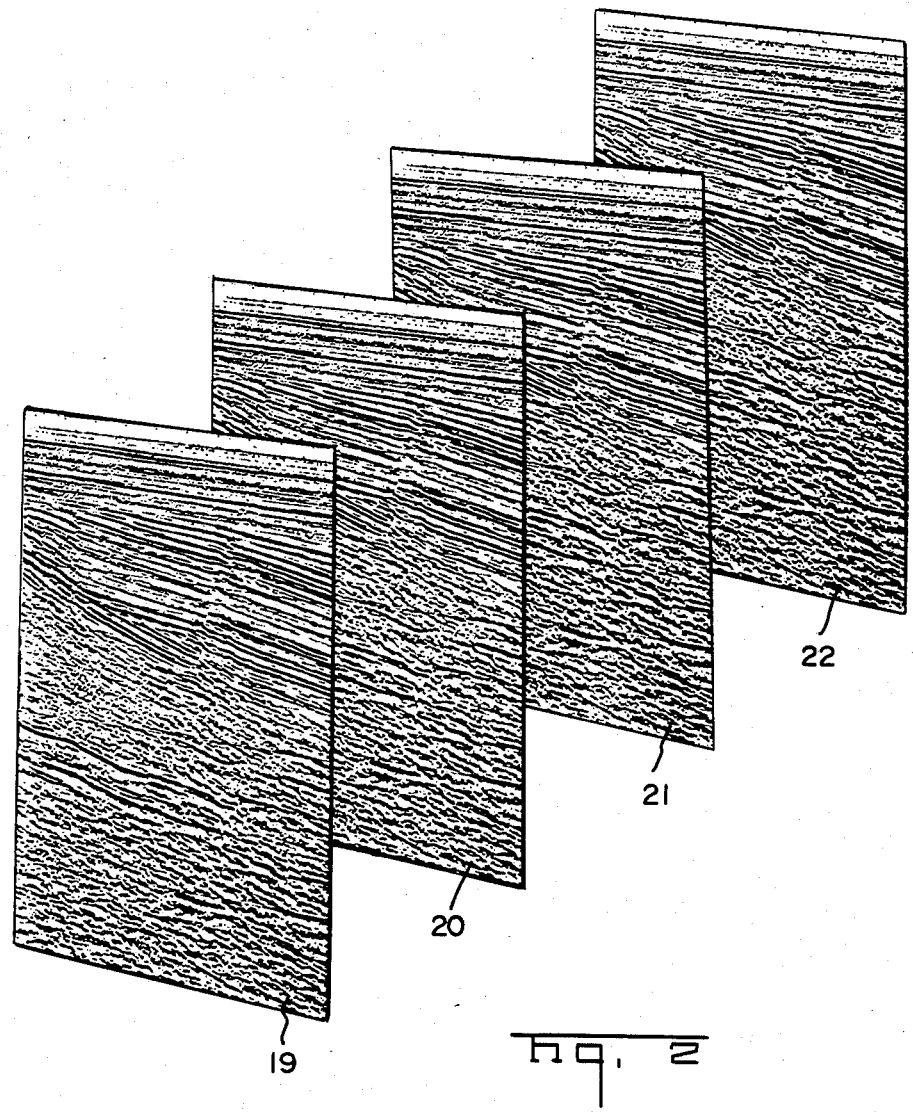
FIG. 2 depicts the successive display of seismic sections on a television monitor.

In accordance with the present invention, seismic sections are displayed on a two-dimensional television monitor screen in a manner which produces a visual impression of the three-dimensional character of the subsurface formations. This can be better understood with reference to FIG. 2 which depicts a seismic section 19 obtained along the line of exploration 15 (FIG. 1), a seismic section 20 obtained along the line of exploration 16, a seismic section 21 obtained along the line of exploration 17, and a seismic section 22 obtained along the line of exploration 18. In accordance with the present invention, these adjacent seismic sections are successively displayed on a television monitor. This provides the geophysicist with a visual impression of the three-dimensional character of the subsurface formations. The visual display presents the impression of movement through the subsurface formations as for example, movement from the point 23 (FIG. 1) through the subsurface formations in the direction of the arrow.

Figure 3:
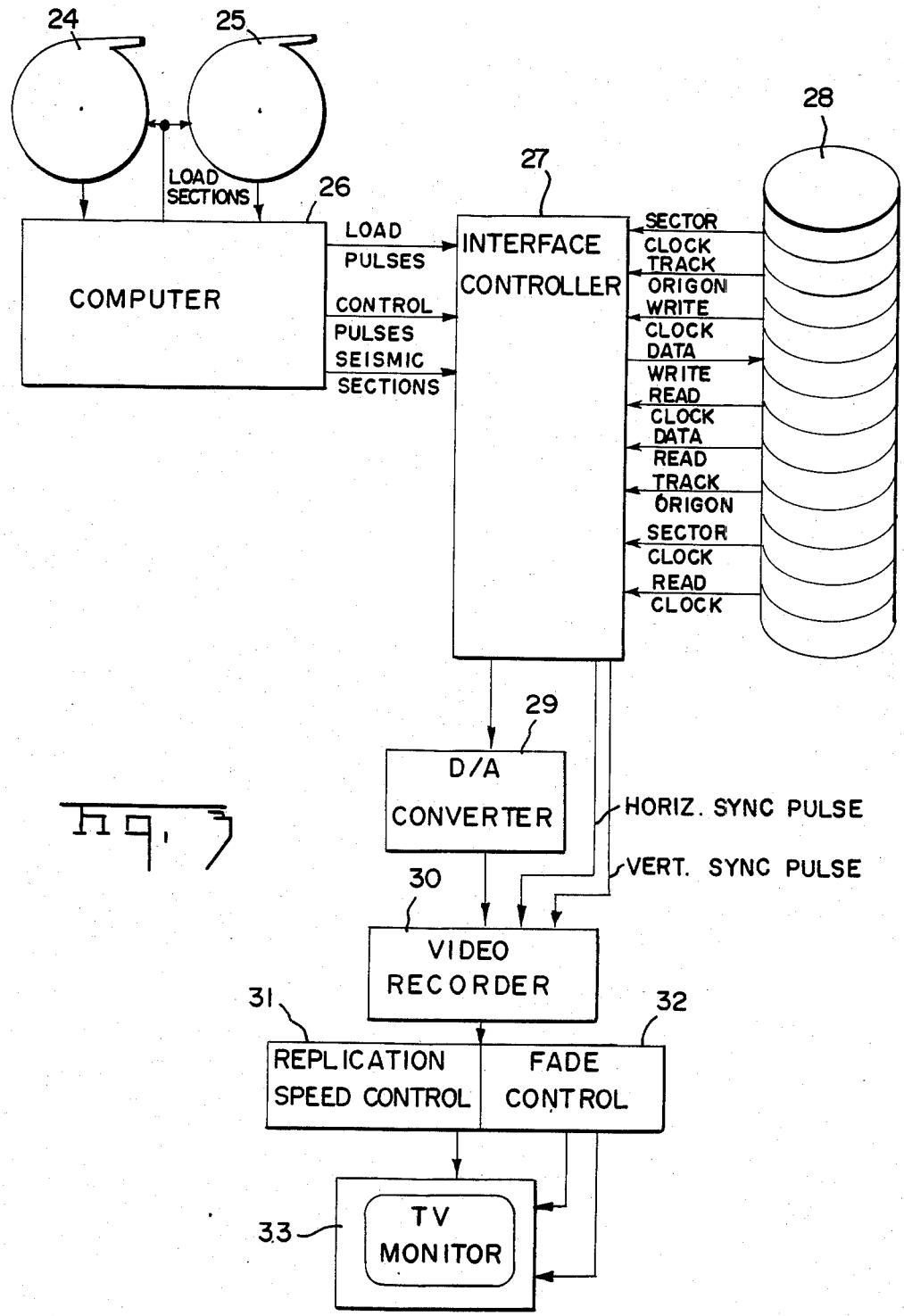
FIG. 3 shows a system for practicing the invention.

A system for practicing the invention is shown in FIG. 3. Seismic traces are stored on the magnetic tape drives 24 and 25. Seismic traces are read into the computer 26 for processing such as that described in the aforementioned Bloomquist et al patent.

In accordance with common practice, the seismic traces are represented by a series of digital words representing the amplitude of detected seismic energy as a function of time. These digital words are arranged in a digital array which is depicted in FIG. 4. In the example under consideration, each trace is represented by 500 5-bit words. In seismic processing, it is common to use many more bits, for example, 15-bit words are used to represent the sample. However, in television graphics I have found that 5 bits are sufficient to provide all of the resolution and clarity of any seismic cross-section of any TV monitor. The monitors are capable of higher resolution but the eye does not see more than 5-bit resolution in a cross-section. In the example under consideration, 480 traces make up a seismic section. In the array depicted in FIG. 4, the digital words are stored as a function of the distance X along the line of exploration from which the seismograms were obtained. The digital words are also stored as a function of time t after the shot of seismic energy. As is well known in seismic exploration, time can be directly converted to depth by known migration techniques. In this specification, reference will be made to storing digital words in an array as a function of the depth of the reflector but it will be understood that this includes storing words as a function of time as depicted in FIG. 4.

The digital arrays representing successive seismic sections are loaded by interface controller 27 (FIG. 3) on to the cyclical memory which is the magnetic disk unit 28. The digital words are retrieved from disk unit 28 in a sequence such that depth (or time) correspond with the horizontal sweep of a television raster. Seismic data is commonly stored by trace.

That is, seismic data is normally stored trace 1, sample 1; trace 1, sample 2; trace 1, sample 3 . . . ; trace 1, sample 500 . . . ; trace 2, sample 1; trace 2, sample 2 . . . ; trace 2, sample 500, and so on. Each trace corresponds with one horizontal sweep of the television raster. The TV monitor is turned on its side so the horizontal trace becomes a vertical trace, the same as a seismic trace. Because of the interlacing all odd traces 1 through 479 are displayed, then the even numbered traces 2 thru 400 are displayed.

Interface controller 27 produces horizontal and vertical synch pulses synchronizing the horizontal and vertical sweep of the television raster. The operation of interface controller 27 in storing and retrieving the digital words of each array is described in my aforementioned U.S. Pat. No. 3,742,289. As the digital words are retrieved, they are applied to digital to analog converter 29 which converts them to video signals. The video signals, together with the horizontal and vertical sync pulses, are recorded on video recorder 30. The digital arrays are retrieved from memory 28 in a sequence which represents successive, adjacent, seismic sections. (In the example described, distance corresponds with vertical sweep depth corresponds with horizontal sweep, but the opposite convention could be practiced and the appended claims are intended to cover it.)

Replication speed control 31 controls the speed at which successive seismic sections are displayed. Fade control 32 fades the display of each seismic section to blend it into the display of the succeeding section. Replication speed control 31 and fade control 32 are commercially available video animation systems which can be adapted for the seismic display of the present invention. The seismic sections are successively displayed on the television monitor 33 to produce the visual impression of movement through a three-dimensional subsurface formation as previously discussed.

As an example of a system which is suitable for the practice of this invention, magnetic tape units 24 and 25 are Telex 6253 units; computer 26 is a VAX - 11; disk memory 28 is a Model 5200 Data Disc; video recorder 30 is a TEAC V-1000; and T.V. monitor 33 is a Conrac Model CQF.

While a particular embodiment of the invention has been shown and described, various modifications are within the true spirit and scope of the invention. The appended claims are therefore, intended to cover all such modifications.

What is claimed is:

1. Apparatus for displaying seismograms in a three-dimensional presentation of subsurface formations of a segment of the earth from which said seismograms were obtained comprising:
   a digital computer for generating from said seismograms arrays of digital words representing seismic sections, each word in each array representing the amplitude of reflected seismic energy as a function of distance along a line of exploration and depth of the reflector;
   a digital memory for storing said arrays;
   an interface controller for storing said arrays in said memory and for retrieving the words of each array in a sequence such that said depth corresponds with horizontal sweep of a television raster;
   a digital to analog converter for converting the retrieved words to video signals;
   a video recorder for recording said video signals in a sequence representing successive, adjacent, seismic sections; and
   a video monitor, the video signals from said recorder being applied to said monitor to display the recorded sequence of adjacent seismic sections whereby a visual impression of movement through subsurface formations is produced.

2. The apparatus recited in claim 1 further comprising:
   means for controlling the speed of replication of displaying said seismic sections.

3. The apparatus recited in claim 1 further comprising:
   means for fading the display of each seismic section to blend the display of successive sections.

4. The apparatus recited in claim 1 further comprising:
   magnetic tape drives for storing seismograms as traces, each including a series of digital words representing detected seismic energy as a function of time at a location on a line of exploration;

the output of said tape drives being applied to said computer.

5. In seismic explorations wherein seismic energy is imparted to the earth, is reflected from subsurface interfaces, and is detected as seismograms along lines of exploration, the method of displaying said seismograms in a three-dimensional presentation of the subsurface formations of a segment of the earth from which said seisomograms were obtained comprising:

generating from said seismograms arrays of digital words representing seismic sections, each word in each array representing the amplitude if reflected seismic energy as functions of distance along a line of exploration and depth of the reflector;

storing each of said arrays;

retrieving the words of each array in a sequence such that said depth corresponds with the horizontal sweep of a television raster;

converting the retrieved words to video signals; recording said video signals on a recorder in a sequence representing successive, adjacent, seismic sections;

successively reproducing the recorded sequence of adjacent seismic sections;

displaying in a time sequence one seismic section at a time, the reproduced sequence of adjacent seismic sections on a television monitor; and replacing each displayed seismic section with the display of a geographically aligned, adjacent seismic section, said time sequence having a resolution which produces a visual impression of movement through said subsurface formations.

6. The method recited in claim 5 further comprising:
controlling the speed of replication of displaying said seismic sections.

7. The method recited in claim 5 further comprising:
fading the display of each seismic section to blend the display of successive sections.

8. In seismic exploration wherein seismic energy is imparted to the earth, is reflected from subsurface interfaces, and is detected as seismograms along lines of exploration, the method of displaying digitized seismic sections each representing the amplitude of reflected seismic energy as a function of distance along a line of exploration and depth of the reflector comprising:

storing said sections as arrays of digital words;

retrieving the words of each array in asequence such that said depth corresponds with horizontal sweeps of a television raster;

successfully reproducing the recorded sequence of adjacent seismic sections;

displaying in a time sequence one seismic section at a time, the reproduced sequence of adjacent seismic sections on a television monitor; and replacing each displayed seismic section with the display of a geographically aligned, adjacent seismic section said time sequence having a resolution which produces a visual impression of movement through said subsurface formations.

9. The method recited in claim 8 further comprising:
controlling the speed of replication of displaying said seismic sections.

10. The method recited in claim 8 further comprising:
fading the display of each seismic section to blend the display of successive sections.

* * * * *